Figure 10:
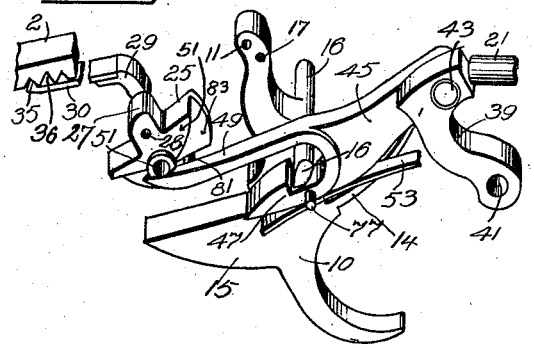

No. 829,453. PATENTED AUG. 28, 1906.
A. H. WORREST.
FIREARM.
APPLICATION FILED MAY 3, 1904.
6 SHEETS—SHEET 1.
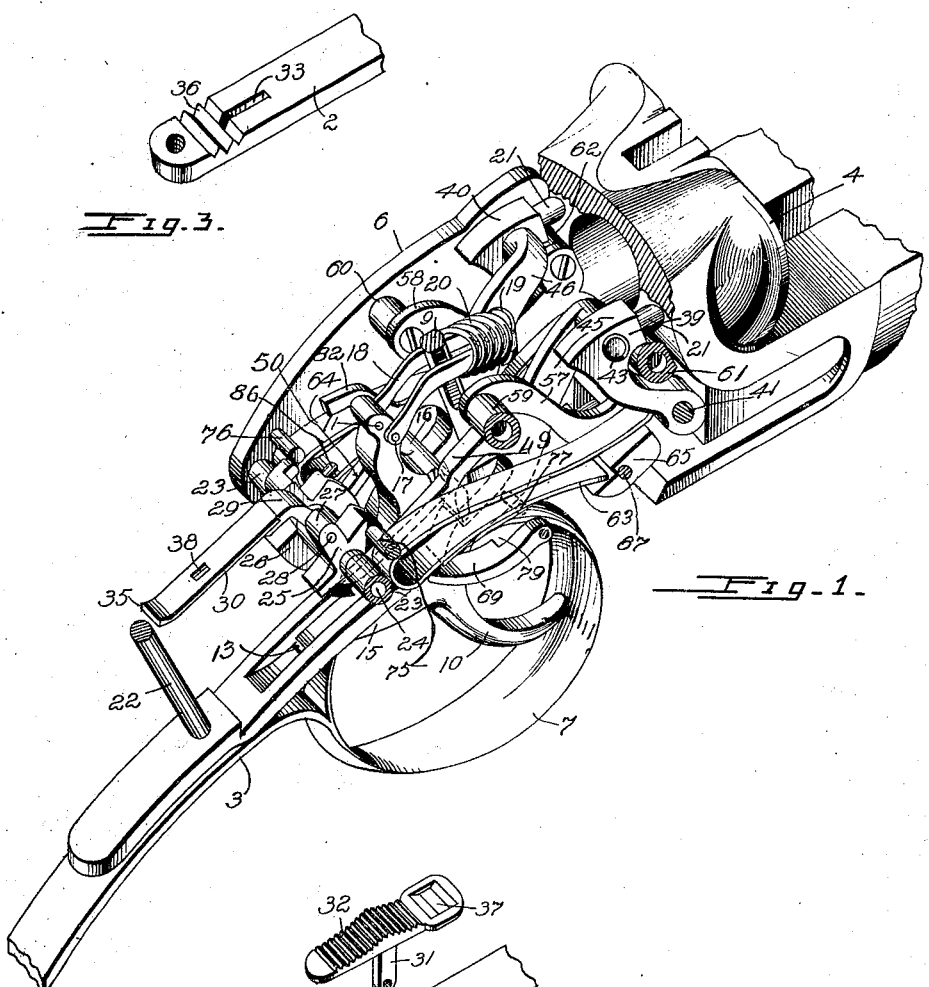
WITNESSES:
INVENTOR.
Alfred H. Worrest.
BY
ATTORNEY.

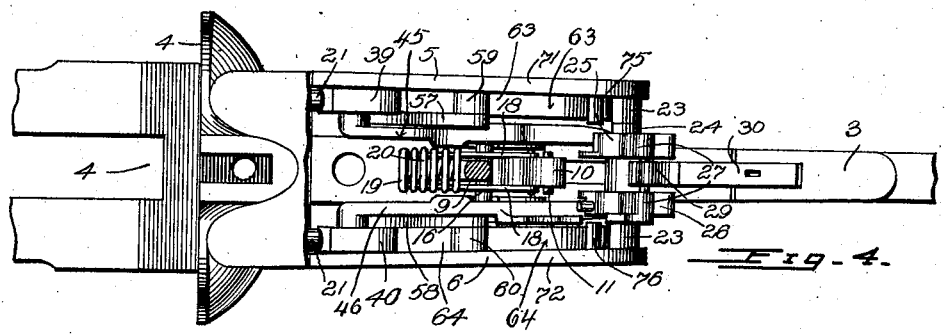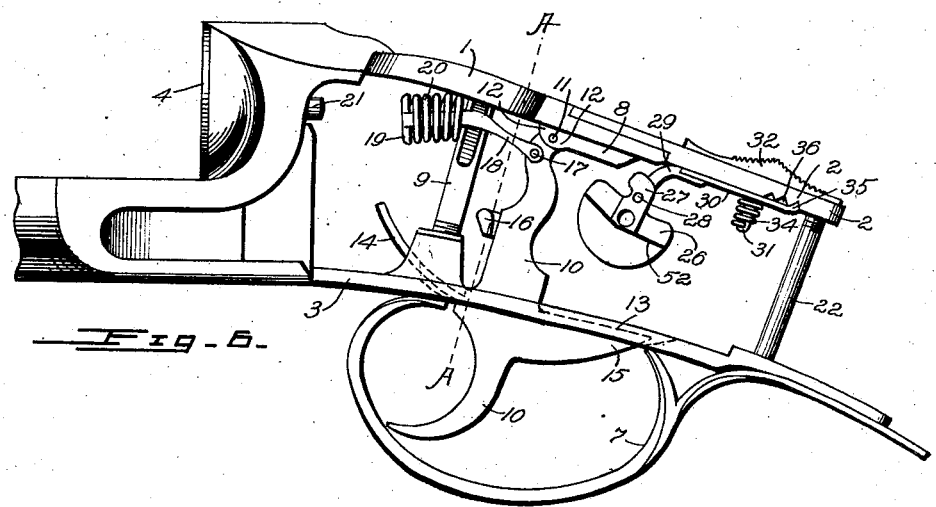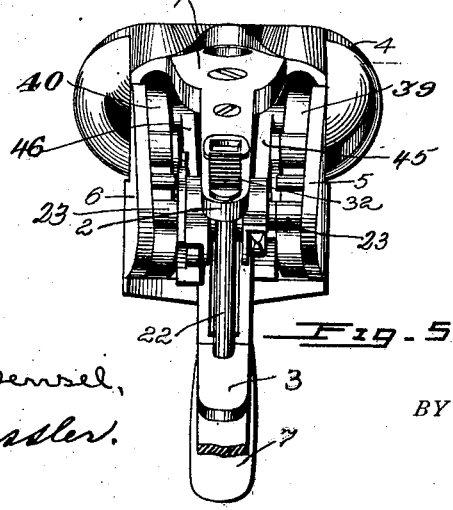

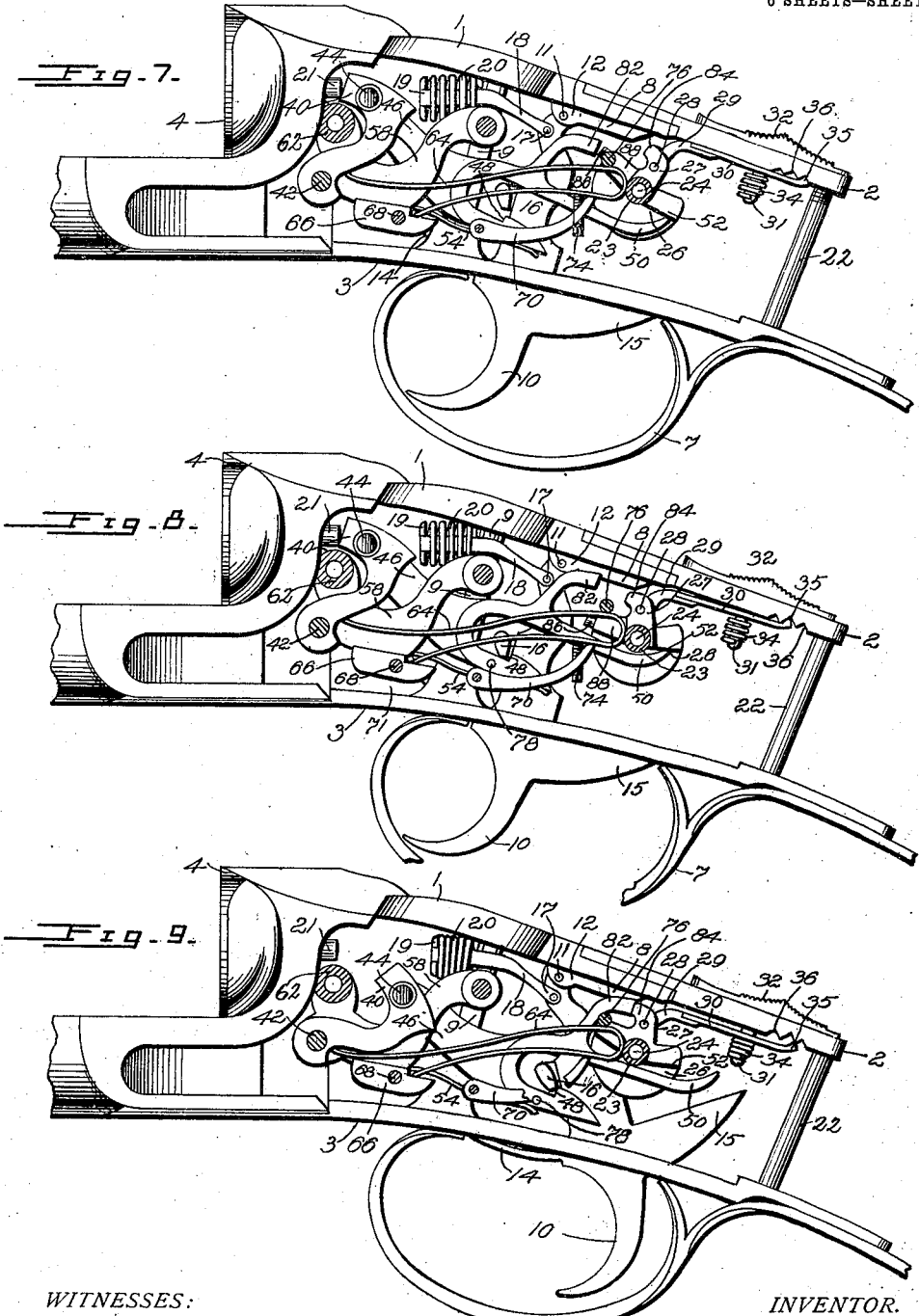

No. 829,453. PATENTED AUG. 28, 1906.
A. H. WORREST.
FIREARM.
APPLICATION FILED MAY 3, 1904.

6 SHEETS—SHEET 4.

WITNESSES:
Chas. J. Hensel
C. G. Bassler

INVENTOR.
Alfred H. Worrest,
BY
Wm. R. Gerhard
ATTORNEY.

No. 829,453. PATENTED AUG. 28, 1906.
A. H. WORREST.
FIREARM.
APPLICATION FILED MAY 3, 1904.

6 SHEETS—SHEET 5.

WITNESSES:
Chas. G. Hensel,
C. G. Bassler.

INVENTOR.
Alfred H. Worrest,
BY
Wm. R. Gerhart
ATTORNEY.

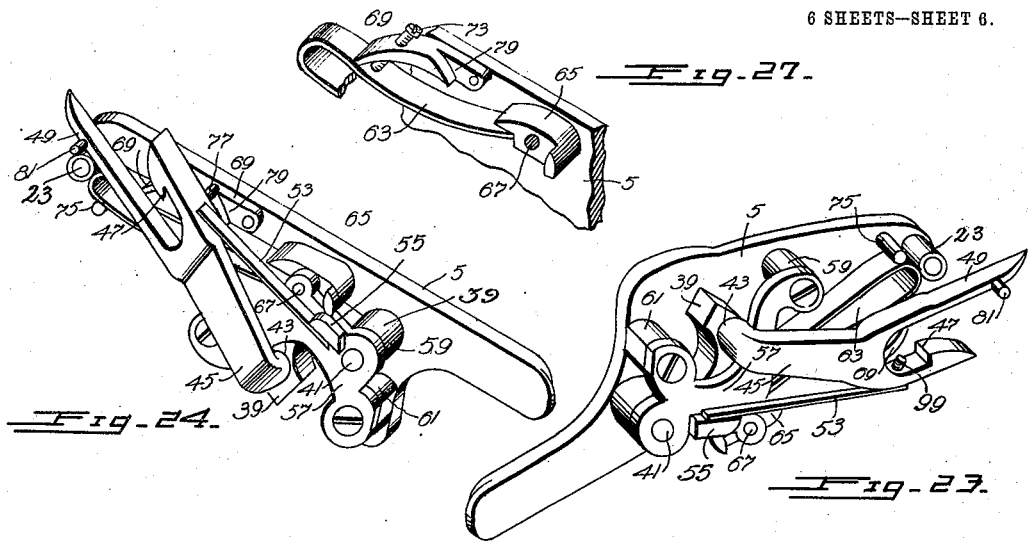
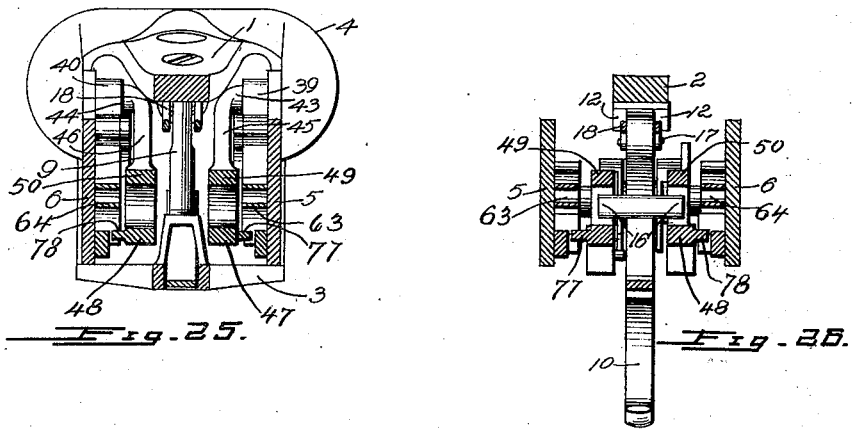
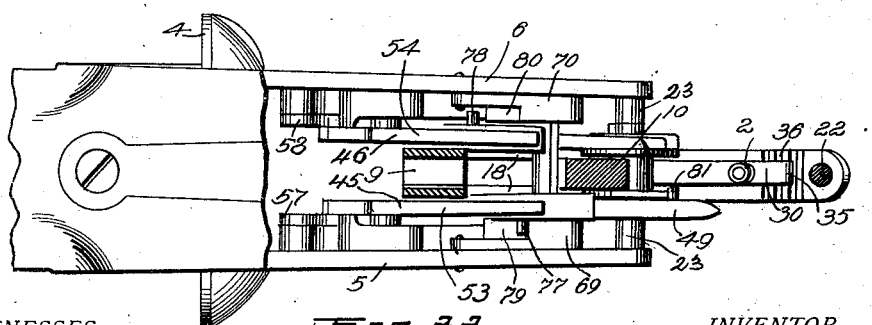

UNITED STATES PATENT OFFICE.

ALFRED H. WORREST, OF LANCASTER, PENNSYLVANIA.

FIREARM.

No. 829,453.     Specification of Letters Patent.     Patented Aug. 28, 1906.

Application filed May 3, 1904. Serial No. 206,254.

*To all whom it may concern:*

Be it known that I, ALFRED H. WORREST, a citizen of the United States, residing at Lancaster, in the county of Lancaster and State of Pennsylvania, have invented certain new and useful Improvements in Firearms, of which the following is a specification, reference being had therein to the accompanying drawings.

This invention relates to improvements in that class of double-barreled firearms in which the hammers are concealed and in which the gun has but a single trigger; and the objects of these improvements are, first, to lessen the liability of the gun to be accidentally discharged; second, to put the means through which the trigger discharges the gun out of position to be engaged by said trigger when the parts of the gun are in position for the discharge of a barrel and so hold said means out of that position as long as may be desired, that there can be no possibility of an accidental discharge through any movement of the trigger; third, to restore said means to a position to be engaged by the trigger, and, fourth, to construct the lock so that action of the means through which one barrel is discharged is positively prevented when the movement of the trigger discharges the other barrel.

The invention consists, first, in the combination of a single trigger with means through which the hammers can be cocked by action of said trigger, the trigger when not in action being disconnected from said means; second, it consists in the combination of a single trigger with means through which the hammers can be cocked alternately by action of said trigger, the trigger when not in action being disconnected from said means; third, it consists in the combination of a single trigger with means through which the hammers can be cocked alternatively by action of said trigger, the trigger when not in action being disconnected from said means; fourth, it consists in the combination of a single trigger with means through which the hammers can be cocked either alternately or alternatively by action of the trigger, the trigger when not in action being disconnected from said means; fifth, it consists of a trigger in combination with means through which said trigger discharges the gun and a device for putting said means out of position to be engaged by the trigger when the parts of the gun are in position for the discharge of a barrel, and, finally, it consists in the construction and combination of various parts, as hereinafter fully described and then pointed out in the claims.

Figure 11:
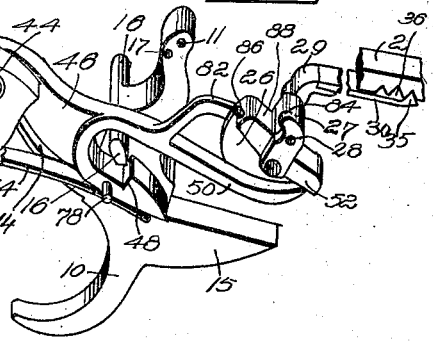
Figure 12:
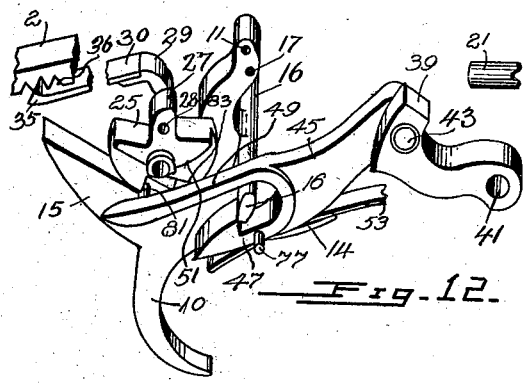
Figure 13:
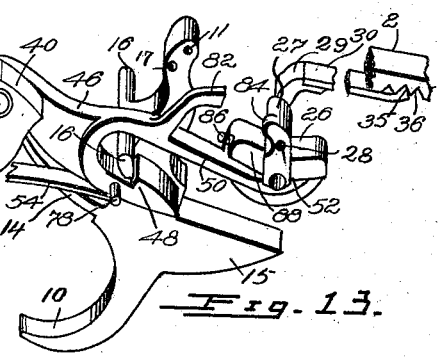
Figure 14:
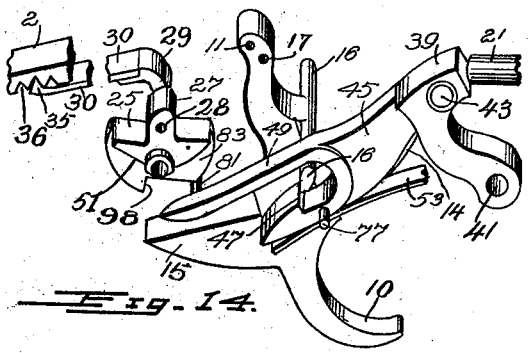
Figure 15:
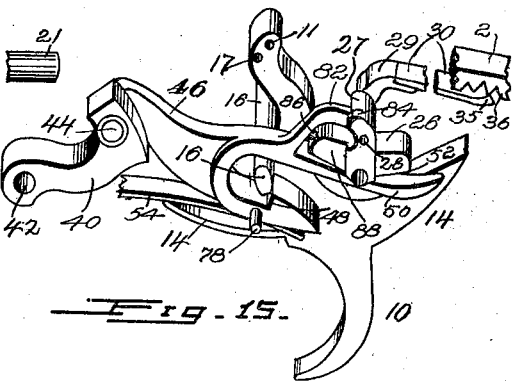
Figures 16, 17:
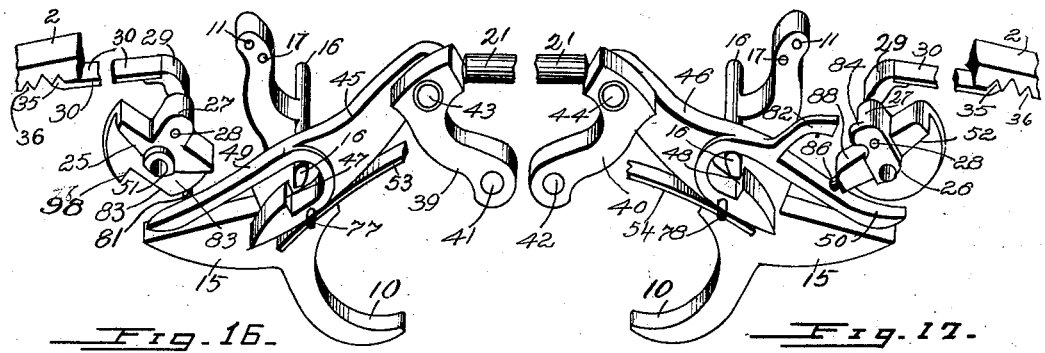
Figures 20, 21:
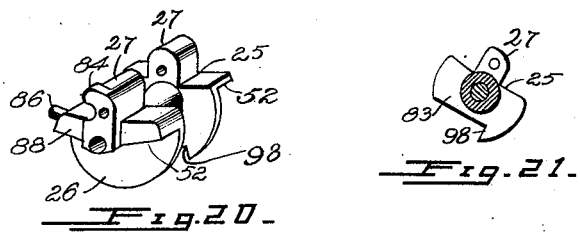
Figures 18, 19:
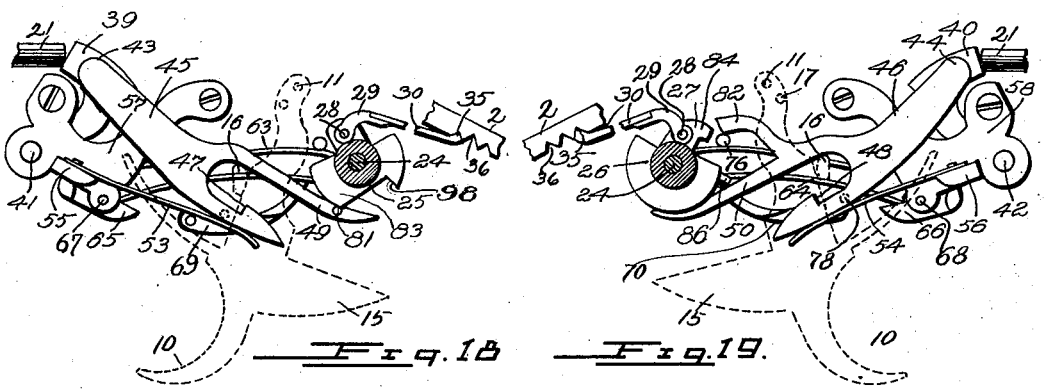

In the accompanying drawings, which form a part of this specification, Figure 1 is a top perspective view of the operating mechanism of a gun-lock embodying the invention, the top plate and the right-side plate being removed, the parts being shown in the positions occupied thereby when the trigger is disengaged from both the hammer-arms; Fig. 2, a top perspective view of the tumblers and adjuster-arm of the rack end of the top plate and of the thumb-button, these parts being separated from each other; and Fig. 3, a bottom perspective view of the rack end of the top plate. Fig. 4 is a top plan view of the operating mechanism; Fig. 5, a rear end elevation thereof; and Fig. 6 a side elevation of the parts permanently connected with the top and bottom plates of the lock. Fig. 7 is a side elevation of the mechanism for firing the left barrel of the gun, the parts being shown in the positions occupied thereby before the right barrel is discharged; Fig. 8, a side view of the same after the right barrel has been discharged, showing the parts in position to be actuated by the trigger; Fig. 9, a like view showing the trigger drawn back and holding the parts in the positions occupied thereby just as said trigger is about to actuate the parts to release the hammer to discharge the left barrel. Fig. 10 is a top perspective view of the outside of the hammer, of the hammer-arm, and of the tumbler of the right barrel, with the trigger and the adjuster-arm, all in the positions occupied thereby when in readiness to cock the right hammer; Fig. 11, a similar view of corresponding parts for discharging the left barrel when those for discharging the right barrel are in the positions shown in Fig. 10; Fig. 12, a like view of corresponding parts for discharging the right barrel, said parts being in the positions they occupy as the hammer is about to be released to strike the firing-pin; Fig. 13, a similar view of corresponding parts for firing the left barrel in the positions they occupy just after the right barrel is discharged; Fig. 14, a view of corresponding parts for firing the right barrel after said barrel is discharged; Fig. 15, a similar view of corresponding parts for discharging the left barrel as the hammer is about to be released to strike the firing-pin. Figs. 16 and 17 are top perspective views of the outside of corresponding parts, showing, respectively, those of the right and those of the left barrel when thrown into such position that no movement of the trigger can have any effect on those of either barrel; and Figs. 18 and 19 are similar views, respectively, of the inner sides of those parts. Fig. 20 is a perspective view of the tumblers detached, and Fig. 21 an inner side view of the right tumbler. Fig. 22 is a bottom plan view of the lock mechanism; Fig. 23, a front and top perspective view of the right side plate, the parts being shown in the positions occupied thereby when the hammer is drawn back; Fig. 24, a front and bottom perspective view of the same; Fig. 25, a section on broken line A A looking toward the front; Fig. 26, a similar view on the same broken line looking toward the rear; and Fig. 27, a front and bottom perspective view of a section of one of the side plates, showing the lower leaf of a hammer and spring and its connections.

Similar numerals indicate like parts throughout the several views.

For the purposes of this specification the terms "right" and "left" in connection with terms designating parts of the lock mechanism refer to parts of said mechanism forming members of the sections thereof brought into action for discharging, respectively, the right barrel and the left barrel.

Referring to the details of the drawings, 1 indicates the top plate of the lock; 2, the rack end of the top plate; 3, the bottom plate; 4, the standing breech; 5, the right side plate of the lock, and 6 the left side plate thereof.

7 indicates the trigger-guard, and 8 is a plate secured to the under side of top plate 1 and located behind the post 9, connecting the top and bottom lock-plates in front of the trigger 10, which has its upper end fulcrumed at 11 between jaws 12 on the front end of plate 8. The trigger extends from fulcrum 11 down and through slot 13 in the bottom plate 3, and it has thereon, projecting front and back, respectively, extensions 14 and 15, that serve to close said slot 13 as the trigger is moved backward and forward, extension 14 passing through a groove in the base of post 9, as shown in Fig. 25. Between the top and bottom plates of the lock a transversely-disposed bar is secured to the trigger, forming hooks 16 for a purpose to be described. To opposite sides of the upper end of the trigger at 17 are pivoted links 18, which extend forward on opposite sides of and beyond post 9 and are attached to the edge of a disk 19. A spring 20 is coiled around links 18 and has one end bearing against said disk 19 and the other end against post 9, thus acting to retract the trigger after it has been pulled back and to maintain it in an operative position.

21 indicates the firing-pins, and 22 the rear post connecting the top and bottom plates of the lock.

On the inner faces of the rear ends of the side plates 5 and 6 of the lock are formed oppositely-located sockets 23, wherein are journaled the ends of a spindle 24, passing through a tubular cylinder having rigidly formed thereon two tumblers, one, 25, comprising a part of the mechanism for discharging the right barrel and the other, 26, a part of that for discharging the left barrel. On those tumblers are oppositely-disposed lugs 27, whereby is supported a hinge-pin 28, and on pin 28 is hinged an upwardly and rearwardly curved arm 29, attached to an adjuster-arm 30, movably secured to the under side of rack end 2 of the top plate by a hanger 31 on the bottom of thumb-button 32, said hanger passing through a slot 33 in rack end 2 and an opening 38 in said adjuster-arm 30, and on the lower end of hanger 31 is coiled a spring 34, that holds said adjuster-arm up against rack end 2 of top plate 1 with a yielding pressure. The free end of adjuster-arm 30 is upturned to form a toe 35, adapted to engage either one or the other of the notches 36 in the under side of rack end 2 of the top plate. In the forward end of thumb-button 32 is an opening 37, that is located alternatively over any one of three letters on the top of said rack end 2 of the top plate. Beginning from the rear, these three letters are "R," indicating that the mechanism is in proper position for discharging the right barrel, "L" that the mechanism is in position for discharging the left barrel, and "S" that neither barrel can be discharged.

39 is the right hammer, and 40 is the left hammer, pivoted, respectively, at 41 and 42. To the heads of these hammers at 43 and 44 are pivoted rearwardly-extending bifurcated arms 45 and 46, on the lower jaws whereof are formed shoulders 47 and 48, adapted to be engaged by hooks 16 of the trigger 10, while the upper jaws 49 and 50 are pressed upward against cams 51 and 52 on the sides of tumblers 25 and 26 by springs 53 and 54, having their rear ends bearing against the under sides of said lower jaws and their front ends secured on brackets 55 and 56 on the inner faces of the lower ends of guide-plates 57 and 58. These guide-plates are held away from the side plates by tubular studs 59 on the right and 60 on the left, through which studs said guide-plates are secured to the side plates. The hammers are located between guide-plates 57 and 58 and the side plates 5 and 6, respectively, the pivots 41 and 42 of said hammers also passing through the lower angles of said guide-plates and through tubular studs 61 and 62, holding the front upper ends of the guide-plates away from the side plates and serving as stops to limit the forward throw of the hammers. When the hammers

39 and 40 are drawn back and then released, they are actuated to strike the firing-pins 21 by the action of the mainsprings 63 and 64, loop-shaped and having one end of each bearing, respectively, against shoulders on shoulder-plates 65 and 66, interposed between said guide-plates and the side plates, the other ends of said springs bearing, respectively, against the hammers. Upward movement of the mainsprings is prevented by studs 75 and 76. Below the loops or rear ends of the mainsprings are way-plates 69 and 70, pivoted to the side plates 5 and 6 and held in an adjusted position by set-screws 73 and 74, the upper ends whereof bear against the lower leaves of the mainsprings. On the outer sides of the lower jaws of hammer-arms 45 and 46 are studs 77 and 78, that pass beneath the downwardly-inclined ways 79 and 80 of way-plates 69 and 70 as said hammer-arms are drawn backward, causing the depression of said hammer-arms and the disengagement of the shoulders 47 and 48 thereon from the hooks 16 of trigger 10. The angles at which way-plates 69 and 70 may be set are regulated by said screws 73 and 74, so that said plates may be adjusted to engage studs 77 and 78. The disengagement of the shoulders of the hammer-arms from the hooks of the trigger is further facilitated by bosses 99 in the recesses behind shoulders 47 and 48, for, as will be observed, said hooks are elongated lengthwise of the trigger, and as the trigger moves backward the hooks tilt forward, and the tops thereof engage bosses 99 and aid in disengaging the lower ends of said hooks from the shoulders.

When the different members of the lock mechanism are in their normal positions, the hammers rest against the firing-pins, and the right side of said mechanism is disposed for discharging the right barrel. In this position the right hammer-arm 45 is held in a raised position by spring 53, whereby shoulder 47 of the lower jaw of said hammer-arm 45 is held in the path of travel of the adjacent hook 16 of the trigger 10, and the upper jaw 49 of said hammer-arm bears against the center 51 of the cam on the outer face of tumbler 25, the toe 35 of adjuster-arm 30 engaging the rearward notch of the rack 36, and the opening 37 of thumb-button 32 being over and exposing the letter "R" on the rack end 2 of the top plate, Fig. 10. At the same time the left hammer-arm 46 is depressed against the tension of spring 54 by the engagement of the upper jaw 50 thereof with the end 52 of the cam on the outer side of tumbler 26, thus throwing the shoulder 48 of the lower jaw of said hammer-arm below the line of travel of the adjacent hook 16 of the trigger, Fig. 11.

The parts of the lock mechanism being in the positions just described, the right barrel is discharged by pulling on the trigger, by the retraction of which the right hammer is drawn backward by the engagement of the adjacent hook 16 of the trigger with the shoulder 47 of the lower jaw of hammer-arm 45, pin 81 on the inner side of the upper jaw 49 of said hammer-arm 45 traveling backward along the base of cam 83 of tumbler 25. The movement of the trigger continuing, said pin 81 engages the shoulder 98 of tumbler 25 and turns both tumblers forward, drawing toe 35 of the adjuster-arm toward and into the middle notch of rack 36. At the same time stud 77 on the outer side of the lower jaw of hammer-arm 45 engages and passes through the inclined way 79 of way-plate 69, and as pin 81 completes said turning of the tumblers the action of the bearing of inclined way 79 on stud 77 disengages shoulder 47 of the lower jaw of right hammer-arm 45 from the adjacent hook 16 of the trigger when the right mainspring 63 actuates the right hammer to strike its firing-pin, Figs. 12 and 14. With this movement of the right hammer the hammer-arm 45 is again drawn forward; but the shoulder 47 of its lower jaw is now held below the line of travel of the adjacent hook 16 of the trigger by the engagement of said pin 81 with the point of the cam 83 of tumbler 25, Fig. 14. With the parts of the lock mechanism for operating the right hammer in the position last described the shoulder 48 of the lower jaw of the left hammer-arm 46 is held in the path of travel of the adjacent hook 16 of trigger 10 by the upward pressure of spring 54, and the upper jaw 50 of said left hammer-arm bears upward against cam 52 of tumbler 26. As the trigger is now moved back left hammer 40 is drawn backward through the pressure of the adjacent trigger-hook 16 on said shoulder 48 of the lower jaw of the left hammer-arm 46. The stud 78 on the outer side of said lower jaw of hammer-arm 46 engages and passes through the inclined way 80 of way-plate 70, and the upwardly and rearwardly extending prong 82 on the upper jaw 50 of the left hammer-arm engages the stud 84 on the left tumbler 26 and revolves both tumblers backward, and the action of the bearing of inclined way 80 on stud 78 disengages shoulder 48 of the lower jaw of the left hammer-arm 46 from the adjacent hook 16 of the trigger, when the left mainspring 64 causes the left hammer to strike its firing-pin, these movements engaging toe 35 of adjuster-arm 30 with the rear notch of rack 36 and throwing the whole lock mechanism into position for again discharging the right barrel, Figs. 10 and 11.

To depress both hammer-arms 45 and 46, so that the shoulders 47 and 48 of the lower jaws thereof may both be held out of the path of travel of the hooks 16 of trigger 10, and thus prevent any movement of said trigger from actuating either one of the hammers, adjuster-arm 30 is moved forward through thumb-button 32 until the toe 35 of said adjuster-arm engages the front notch of rack 36. This movement of the adjuster-arm turns both tumblers forward until the right hammer-arm 45 is depressed by the engagement of pin 81 on the inside of the upper jaw of said hammer-arm with the front of cam 83 of the right tumbler 25, Figs. 16 and 18, and the left hammer-arm 46 is similarly depressed by the engagement of stud 86 on the front of rib 88 of said left tumbler with the top of the upper jaw 50 of said left hammer-arm 46, Figs. 17 and 19.

It will be understood that when adjuster-arm 30 is moved so that the toe 35 on said adjuster-arm engages either the center or the front notch of rack 36 the opening 37 in thumb-button 32 is over and exposes, respectively, the letters "L" and "S" on the top of the rack end 2 of top plate 1. When it is desired to discharge either the right or the left barrel continuously, said adjuster-arm 30 is moved after each discharge, so as to reëngage the toe 35 thereof with either the rear or the center notch of rack 36, as the case may be.

I do not restrict myself to the details of construction herein shown and described, as it is obvious that many alterations may be made therein without departing from the principle and scope of the invention.

Having thus described my invention, what I claim as new, and desire to secure by Letters Patent, is—

1. The combination, in a double-barreled gun, of a hammer for each barrel, a single trigger, and means through which either of the hammers can be cocked by action of the trigger, the trigger when not in action being disconnected from said means.

2. The combination, in a double-barreled gun, of a hammer for each barrel, a single trigger, and means through which the hammers can be alternately cocked by action of the trigger, the trigger when not in action being disconnected from said means.

3. The combination, in a double-barreled gun, of a hammer for each barrel, a single trigger, means through which either of the hammers can be cocked by action of the trigger, the trigger when not in action being disconnected from said means, and mechanism for so actuating said means as to cause the action of the trigger to cock the hammers alternatively.

4. The combination, in a double-barreled gun, of a hammer for each barrel, a single trigger, means through which the hammers can be cocked alternately by action of the trigger, the trigger when not in action being disconnected from said means, and mechanism for so actuating said means as to cause the action of the trigger to cock the hammers alternatively.

5. The combination in a double-barreled gun, of a hammer for each barrel, a single trigger, means through which the hammers can be automatically cocked alternately by action of the trigger, the trigger when not in action being disconnected from said means, and mechanism for so actuating said means as to cause the action of the trigger to cock the hammers alternatively.

6. The combination, in a double-barreled gun, of a hammer for each barrel, a single trigger, means through which either of the hammers can be cocked by action of the trigger, the trigger when not in action being disconnected from said means, and means for causing the action of the trigger to cock the hammers from right to left or from left to right.

7. The combination, in a double-barreled gun, of a hammer for each barrel, an arm attached to each hammer, and a single trigger adapted to be connected with either of said arms to cock the hammer connected therewith, the trigger when not in action being disconnected from said arms.

8. The combination, in a double-barreled gun, of a hammer for each barrel, an arm attached to each hammer and having a shoulder thereon, and a single trigger having hooks adapted to engage said shoulders to cock the hammers, the trigger when not in action being disconnected from said arms.

9. The combination, in a double-barreled gun, of a hammer for each barrel, an arm attached to each hammer, means for putting either hammer-arm into position to be connected with the trigger, a single trigger constructed to be connected with either of said arms to cock the hammer connected therewith, and means for holding either of the hammer-arms out of position for being connected with the trigger.

10. The combination, in a double-barreled gun, of a hammer for each barrel, an arm attached to each hammer, means for putting each hammer-arm into position to be connected with the trigger, a single trigger constructed to be connected with either of said arms to cock the hammer connected therewith, tumblers adapted to hold either of the hammer-arms out of position to be engaged by the trigger, and means for automatically so actuating the tumblers that the hammer-arms may be successively engaged by the trigger.

11. The combination, in a double-barreled gun, of a hammer for each barrel, an arm attached to each hammer, means for putting each hammer-arm into position to be connected with the trigger, a single trigger constructed to be connected with either of said arms to cock the hammer to which the connected hammer-arm is attached, tumblers adapted to hold either of the hammer-arms out of position to be engaged by the trigger, and means for so actuating the tumblers that the same hammer-arm may be successively engaged by the trigger.

12. The combination, in a double-barreled gun, of a hammer for each barrel, an arm attached to each hammer, means for putting each hammer-arm into position to be connected with the trigger, a single trigger constructed to be connected with either of said arms to cock the hammer to which the connected hammer-arm is attached, tumblers adapted to hold either of the hammer-arms out of position to be engaged by the trigger, and means whereby the tumblers can be adjusted to alternatively put the hammer-arms out of position to be engaged by the trigger.

13. The combination, in a double-barreled gun, of a hammer for each barrel, an arm attached to each hammer, means for putting each hammer-arm into position to be connected with the trigger, a single trigger constructed to be connected with either of said arms to cock the hammer to which the connected hammer-arm is attached, tumblers adapted to put the hammer-arms alternately out of position to be engaged by the trigger, and means whereby the tumblers can be adjusted to alternatively put the hammer-arms out of position to be engaged by the trigger.

14. The combination, in a double-barreled gun, of a hammer for each barrel, an arm attached to each hammer, means for putting each hammer-arm into position to be connected with the trigger, a single trigger constructed to be connected with either of said arms to cock the hammer to which the connected hammer-arm is attached, tumblers adapted to automatically put the hammer-arms alternately out of position to be engaged by the trigger, and means whereby the tumblers can be adjusted to alternatively put the hammer-arms out of position to be engaged by the trigger.

15. The combination, in a gun-lock, of a hammer, an arm on the hammer, a trigger adapted to engage the hammer-arm, a stud on the hammer-arm, and a way located to be engaged by said stud, to break connection between said arm and the trigger.

16. The combination, in a gun-lock, of a hammer, an arm on the hammer, a trigger adapted to engage the hammer-arm, an inclined way, and a stud on the hammer-arm adapted to engage said way, for breaking connection between said arm and the trigger.

17. The combination, in a gun-lock, of a hammer, an arm on the hammer, a trigger adapted to engage the hammer-arm, an adjustable inclined way, and a stud on the hammer-arm adapted to engage said way, for breaking connection between said arm and the trigger.

18. The combination, in a gun-lock, of a hammer, an arm on the hammer, a trigger adapted to engage the hammer-arm, a plate having a way therein and pivoted at one end, an adjusting-screw passing through the way-plate, and a stud on the hammer-arm adapted to engage the way in said plate, for breaking connection between the hammer-arm and the trigger.

19. The combination, in a gun-lock, of a hammer, an arm pivoted to the hammer and having a shoulder thereon, a trigger, a hook on the trigger constructed to engage said shoulder, whereby the hammer is cocked by movement of the trigger, a plate pivoted at one end adjacent to the hammer-arm and having an inclined way therein, a screw to adjust the other end of said plate, and a stud on the hammer-arm adapted to engage said way and break connection between the trigger and the hammer-arm.

20. The combination, in a gun-lock, of a hammer, an arm connected with the hammer and having a shoulder thereon, a trigger, a hook on the trigger constructed to engage said shoulder, whereby the hammer is cocked by movement of the trigger, means for breaking connection between the trigger and the hammer-arm, and a boss on the hammer-arm, to facilitate breaking the connection between the trigger and the hammer-arm.

21. The combination, in a gun-lock, of a hammer, an arm connected with the hammer and having a shoulder thereon, a trigger, a hook on the trigger elongated lengthwise thereof and constructed to engage said shoulder, whereby the hammer is cocked by movement of the trigger, means for breaking connection between the trigger and the hammer-arm, and a boss on the hammer-arm located to be engaged by the upper part of the trigger-hook as the trigger is moved backward, to facilitate breaking connection between the trigger and the hammer-arm.

22. The combination, in a gun-lock, of a hammer, an arm connected with the hammer and having a shoulder thereon, a trigger, a hook on the trigger elongated lengthwise thereof and constructed to engage said shoulder, whereby the hammer is cocked by movement of the trigger, an adjustable plate adjacent to the hammer-arm and having a way therein, a stud on the hammer-arm adapted to engage said way and break connection between the trigger and the hammer-arm, and a boss on the hammer-arm near the shoulder and located to be engaged by the upper part of the trigger-hook as the trigger is moved backward, to facilitate breaking connection between the trigger and the hammer-arm.

23. The combination, in a gun-lock, of a hammer, an arm connected with the hammer, a shoulder on the hammer-arm, a trigger having a hook adapted to engage the shoulder on the hammer-arm, whereby the hammer is cocked by movement of the trigger, a downwardly-inclined way, a stud on the hammer-arm coacting with the downwardly-inclined way to break connection between the trigger and the hammer-arm, a tumbler, a jaw on the hammer-arm engaging the tumbler, and a projection on the tumbler adapted to bear against said jaw and throw the shoulder on the hammer-arm out of the path of travel of the hook on the trigger.

24. The combination, in a double-barreled gun, of a hammer for each barrel, an arm connected with each hammer, and a trigger disengaged when not in action from both hammer-arms, but adapted to be connected with either of said hammer-arms to cock the hammer connected therewith.

25. The combination, in a gun, of a trigger, means through which the trigger discharges the gun, and a device adapted, when the parts of the gun are in position for the discharge of a barrel, to put said means out of position to be engaged by the trigger, to hold said means out of that position, and to release said means, that the same may be returned to said position.

26. The combination, in a double-barreled gun, of a hammer for each barrel, a single trigger, means through which the trigger can be connected with either hammer, a device adapted, when the parts of the gun are in position for the discharge of a barrel, to put said means out of position to be engaged by the trigger.

27. The combination, in a double-barreled gun, of a hammer for each barrel, a single trigger, means through which the trigger can be connected with either hammer, a device adapted, when the parts of the gun are in position for the discharge of a barrel, to put said means out of position to be engaged by the trigger and to hold said means out of that position.

28. The combination, in a double-barreled gun, of a hammer for each barrel, a single trigger, means through which the trigger can be connected with either hammer, a device adapted, when the parts of the gun are in position for the discharge of a barrel, to put said means out of position to be engaged by the trigger, to hold said means out of that position, and to release said means, that the same may be returned to said position.

29. The combination, in a double-barreled gun, of a hammer for each barrel, a single trigger, means through which the trigger can be connected with either hammer, a device adapted, when the parts of the gun are in position for the discharge of one or both barrels, to put the whole or a part of said means out of position to be connected with the trigger, to hold said means out of that position, and to release said means, that the same may be returned to said position.

30. The combination, in a double-barreled gun, of the hammers, arms connected with the hammers and having shoulders, a trigger having hooks adapted to engage said shoulders, springs acting to put the shoulders on the hammer-arms in the path of travel of the hooks on the triggers, inclined ways adjacent to the hammer-arms, studs on the hammer-arms adapted to engage said ways and disconnect the hammer-arms from the trigger, tumblers, and projections on the tumblers to engage the hammer-arms, whereby either one or both of said arms can be put out of position to be engaged by the trigger.

31. The combination, in a double-barreled gun, of the hammers, arms attached to the hammers, a trigger constructed to be connected with said hammer-arms to cock the hammers, means for putting the hammer-arms in position to be connected with the trigger, tumblers adapted to be oscillated about an axis to prevent connection of either of the hammer-arms with the trigger, and means for adjusting the position of the tumblers.

32. The combination, in a double-barreled gun, of the hammers, arms attached to the hammers, a trigger constructed to be connected with the hammer-arms to cock the hammers, means for putting the hammer-arms into position to be connected with the trigger, tumblers adapted to be oscillated about an axis to prevent connection of either one or both of the hammer-arms with the trigger, and means for adjusting the position of the tumblers.

33. The combination, in a gun, of a trigger disengaged when not in action from the means through which it discharges the gun, said means, mechanism for putting said means out of position for being engaged by the trigger, mechanism for putting said means into position to be connected with the trigger, and a device adapted to indicate whether or not said means are in a position to be connected with the trigger.

34. The combination, in a gun, of a trigger, means through which the trigger discharges the gun, mechanism adapted to put said means out of position to be engaged by the trigger, a device for putting said means into position to be engaged by the trigger, an adjuster-arm through which said mechanism is actuated, and a device adapted to indicate whether or not said means are in position to be connected with the trigger.

35. The combination, in a gun, of a trigger, means through which the trigger discharges the gun, mechanism adapted to put said means out of position to be engaged by the trigger, a device for putting said means into position to be engaged by the trigger, an adjuster-arm through which said mechanism is actuated, a device adapted to indicate whether or not said means are in position to be connected with the trigger, and means for securing said adjuster-arm in an adjusted position.

36. The combination, in a double-barreled gun, of a single trigger, means through which the trigger discharges the barrels, mechanism adapted to put the means through which either one or both barrels are discharged out of position to be engaged by the trigger, a device for putting said means into position to be engaged by the trigger, an adjuster-arm adapted to actuate said mechanism, the top of the gun having marks thereon to indicate the position of the means for discharging the barrels, and a device on the top of the gun whereby the adjuster-arm is actuated and having a slot therein through which said marks are exposed.

37. The combination, in a double-barreled gun, of a single trigger, a device for putting the mechanism through which either one or both barrels are discharged out of position to be engaged by the trigger, the top plate of the gun provided with a rack, an adjuster-arm inside of the top plate, through which said device can be actuated, a toe on the adjuster-arm adapted to engage the rack of the top plate, and a device for actuating the adjuster-arm and having an opening therein, the top plate having marks thereon that show through said opening to indicate the position of the parts of said mechanism.

38. The combination, in a double-barreled gun, of a single trigger, tumblers, whereby the mechanism through which either barrel is discharged is put out of position for being engaged by the trigger, the top plate of the gun provided with a rack, a sliding adjuster-arm inside of the top plate, through which the tumblers can be actuated, a toe on the adjuster-arm adapted to engage the rack of the top plate, and a device for actuating the adjuster-arm and having an opening through it, the top plate having marks thereon that show through said opening, to indicate the position of the parts of said mechanism.

39. The combination, in a double-barreled gun, of the hammers, arms attached to the hammers, a trigger constructed to be connected with the hammer-arms to cock the hammers, means for holding the hammer-arms in position to be connected with the trigger, tumblers adapted to be oscillated about an axis to prevent connection of the hammers with the trigger, lugs on the tumblers, a hinge-pin supported by the lugs, and an adjuster-arm hinged on said pin.

40. The combination, in a gun, of a hammer, an arm connected therewith, a trigger adapted to be connected with the hammer-arm to cock the hammer, sockets on the side plates of the lock, a rod mounted in the sockets, a tumbler on the rod, and means for oscillating the tumbler on the rod, to put the hammer-arm out of position to be engaged by the trigger.

41. The combination, in a double-barreled gun, of the hammers, arms connected therewith, a trigger adapted to be connected with the hammer-arms to cock the hammers, sockets on the side plates of the lock, a rod mounted in the sockets, a revoluble barrel on the rod, and tumblers on the barrel, the tumblers operatively engaging the hammer-arms to put said arms out of position to be engaged by the trigger.

42. The combination, in a double-barreled gun, of the hammers, arms connected therewith, means for forcing the hammer-arms upward, a trigger adapted to be connected with the hammer-arms to cock the hammers, sockets on the side plates of the lock, a rod mounted in the sockets, a revoluble barrel on the rod, and tumblers on the barrel adapted to prevent upward movement of the hammer-arms and to put said arms out of position to be engaged by the trigger.

43. The combination, in a double-barreled gun, of the hammers, arms on the hammers, a trigger adapted to engage said arms to cock the hammers, tumblers mounted on an axis, and an adjuster-arm through which the position of the tumblers can be regulated, the tumblers operatively engaging the hammer-arms to put said hammer-arms out of position to be engaged by the trigger.

44. The combination, in a double-barreled gun, of the hammers, arms on the hammers, a trigger disengaged from the hammer-arms when not in action, but adapted to be connected therewith to cock the hammers, tumblers mounted on an axis, and means for automatically regulating the position of the tumblers, the tumblers operatively engaging the hammer-arms to put said arms out of position to be engaged by the trigger.

45. The combination, in a double-barreled gun, of the hammers, arms on the hammers, a trigger adapted to engage said arms to cock the hammers, tumblers, an adjuster-arm through which the position of the tumblers can be regulated, and means through which the position of the tumblers can be automatically regulated, the tumblers operatively engaging the hammer-arms to put said arms out of position to be engaged by the trigger.

46. The combination, in a double-barreled gun, of concealed hammers, arms on the hammers, a trigger adapted to engage said arms to cock the hammers, tumblers engaging the hammer-arms to prevent the connection of the trigger with said arms, and a device connected with the tumblers to indicate the positions of the hammers.

47. The combination, in a double-barreled gun, of the hammers, arms on the hammers, a trigger adapted to engage said arms and cock the hammers, tumblers engaging the hammer-arms to regulate the position of said arms in relation to the trigger, and projections on the hammer-arms adapted to change the position of the tumblers.

48. The combination, in a double-barreled gun, of the hammers, arms on the hammers, a trigger adapted to engage said arms and cock the hammers, tumblers engaging the hammer-arms to regulate the position of said arms in relation to the trigger, an adjuster-arm connected with the tumblers, and a thumb-button connected with the adjuster-arm.

49. The combination, in a double-barreled gun, of the hammers, arms on the hammers, a trigger adapted to engage said arms and cock the hammers, tumblers, projections on the tumblers adapted to throw either hammer-arm out of position for being engaged by the trigger, and projections on the tumblers adapted to simultaneously throw both hammer-arms out of position for being engaged by the trigger.

50. The combination, in a double-barreled gun, of the hammers, arms on the hammers, means for throwing the hammer-arms into position to be engaged by a trigger, a trigger adapted to engage said arms and cock the hammers, tumblers, projections on the tumblers adapted to throw either hammer-arm out of position for being engaged by the trigger, projections on the tumblers adapted to simultaneously throw both hammer-arms out of position for being engaged by the trigger, and an arm connected with the tumblers to adjust the same in position.

ALFRED H. WORREST.

Witnesses:
C. G. BASSLER,
WM. R. GERHART.